United States Patent

Elliott et al.

[11] 4,146,275
[45] Mar. 27, 1979

[54] RESIDUAL PRESSURE RELIEF VALVE FOR BRAKES

[76] Inventors: Robert H. Elliott, 24804 Towne Rd., Southfield, Mich. 48034; Clayton F. Elliott, 875 Blakely Rd., Sanford, Mich. 48657

[21] Appl. No.: 840,952

[22] Filed: Oct. 11, 1977

[51] Int. Cl.² ............................................. B60T 17/04
[52] U.S. Cl. ..................................... 303/82; 137/494; 303/86
[58] Field of Search ............ 137/470, 471, 494, 513.3, 137/513.7, 515.5, 515.3, 517, 519, 533, 535; 303/7, 9, 13, 40, 52, 66–69, 81–82, 84 R, 86, 87, 10, 48, 54, 59; 188/151 R, 151 A, 152

[56] References Cited

U.S. PATENT DOCUMENTS

| | | | |
|---|---|---|---|
| 3,175,572 | 3/1965 | Kauer, Jr. et al. | 137/494 X |
| 3,181,560 | 5/1965 | Worden et al. | 137/494 |
| 3,231,315 | 1/1966 | Turnbull | 303/84 R X |
| 3,422,840 | 1/1969 | Bryant et al. | 137/515.5 X |
| 3,450,154 | 6/1969 | Bueler | 303/52 X |
| 3,522,818 | 8/1970 | Suchy | 137/494 |
| 3,753,599 | 8/1973 | Michellone et al. | 303/119 |
| 4,035,034 | 7/1977 | Sekiguchi | 303/119 X |

Primary Examiner—Stephen G. Kunin
Attorney, Agent, or Firm—Robert H. Elliott

[57] ABSTRACT

An automatic brake release valve in the form of a normally open pressure relief venting structure for air operated vehicular brakes and the like, wherein atmospheric air is vented into the closed brake system intermediate the air brake actuating valves and the brake chambers actuated thereby. This venting valve structure relieves any pressure build-up which occurs as a result of brake valve leakage, since any increase in pressure in this part of the system closes the exhaust valves and actuates the brakes. So that normal brake function is maintained, the venting valve structure closes on a predetermined pressure rise. Thus, when the brakes of the vehicle are applied, a limited amount of air will escape from the system, until the predetermined valve closing pressure is reached, and during this air escape period, water condensate is exhausted from the system automatically, while providing maximum brake efficiency.

23 Claims, 17 Drawing Figures

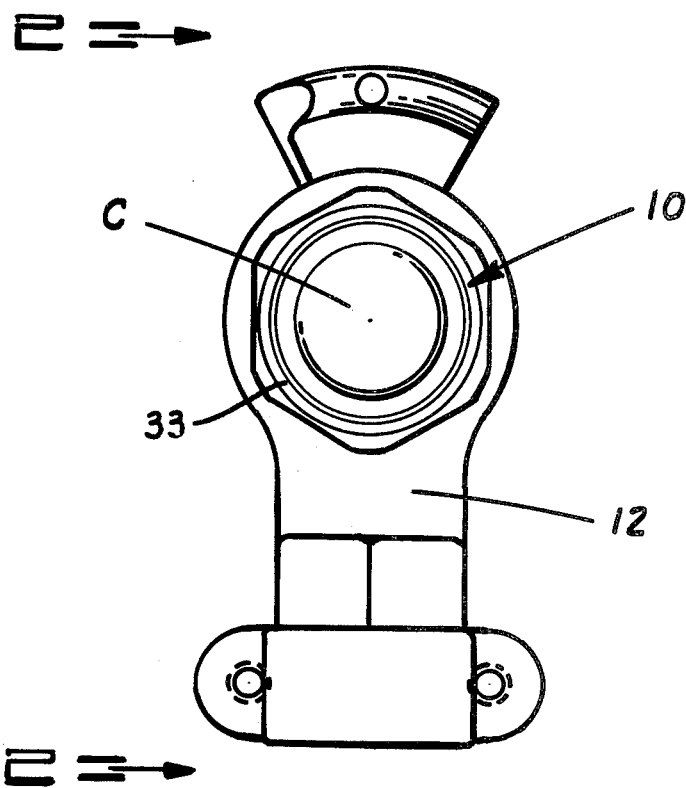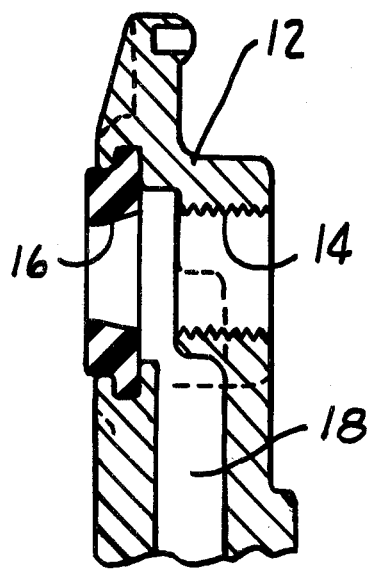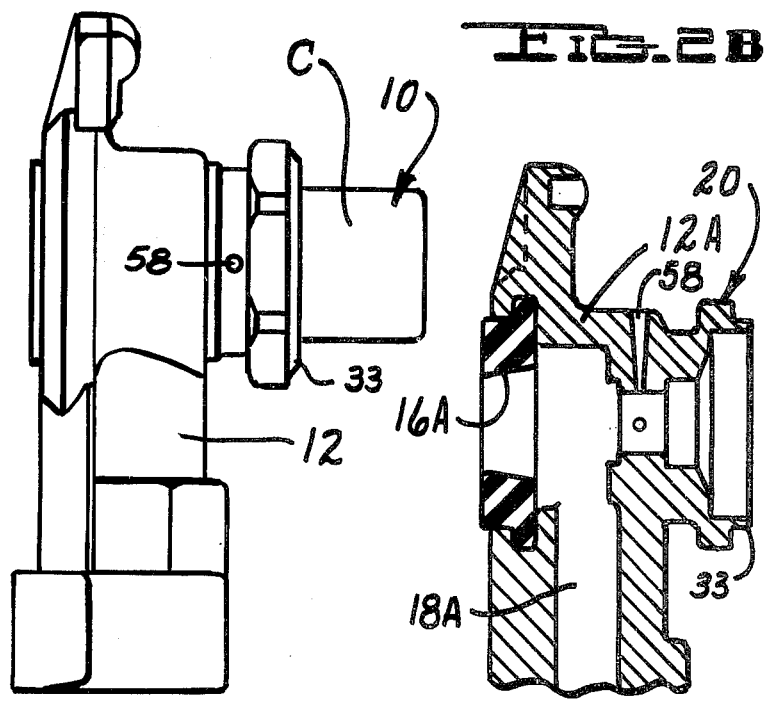

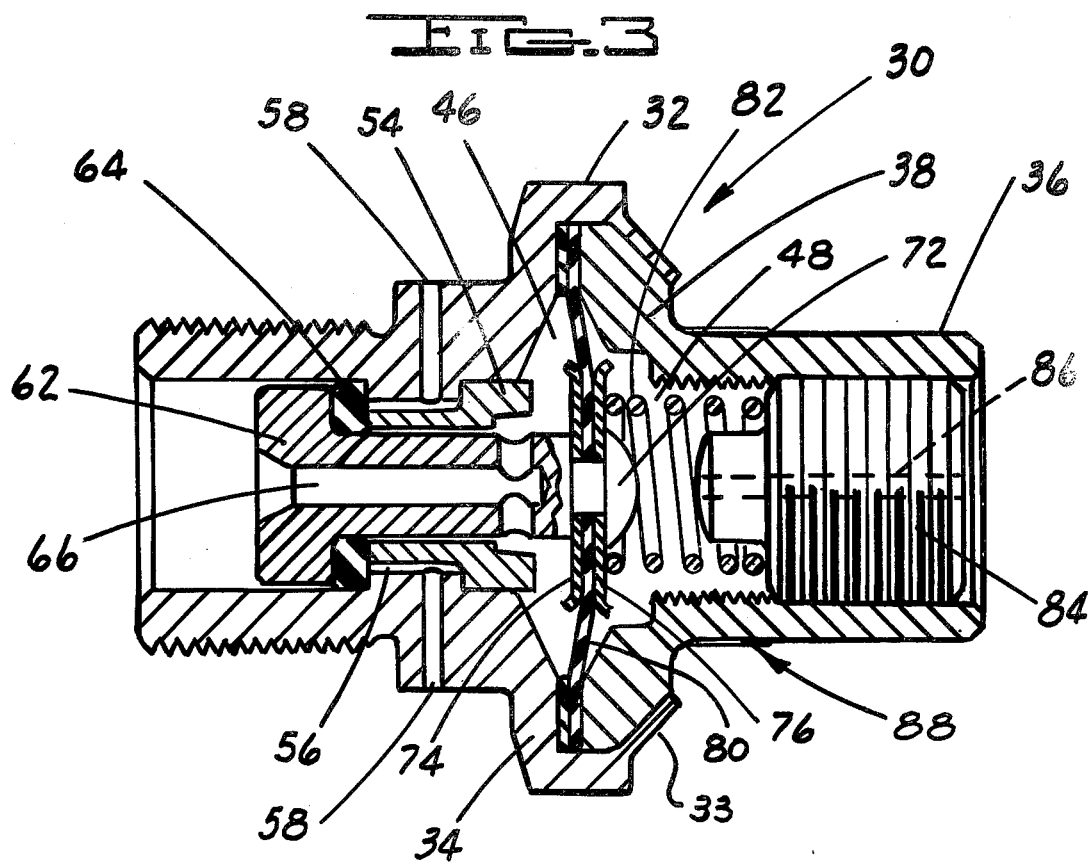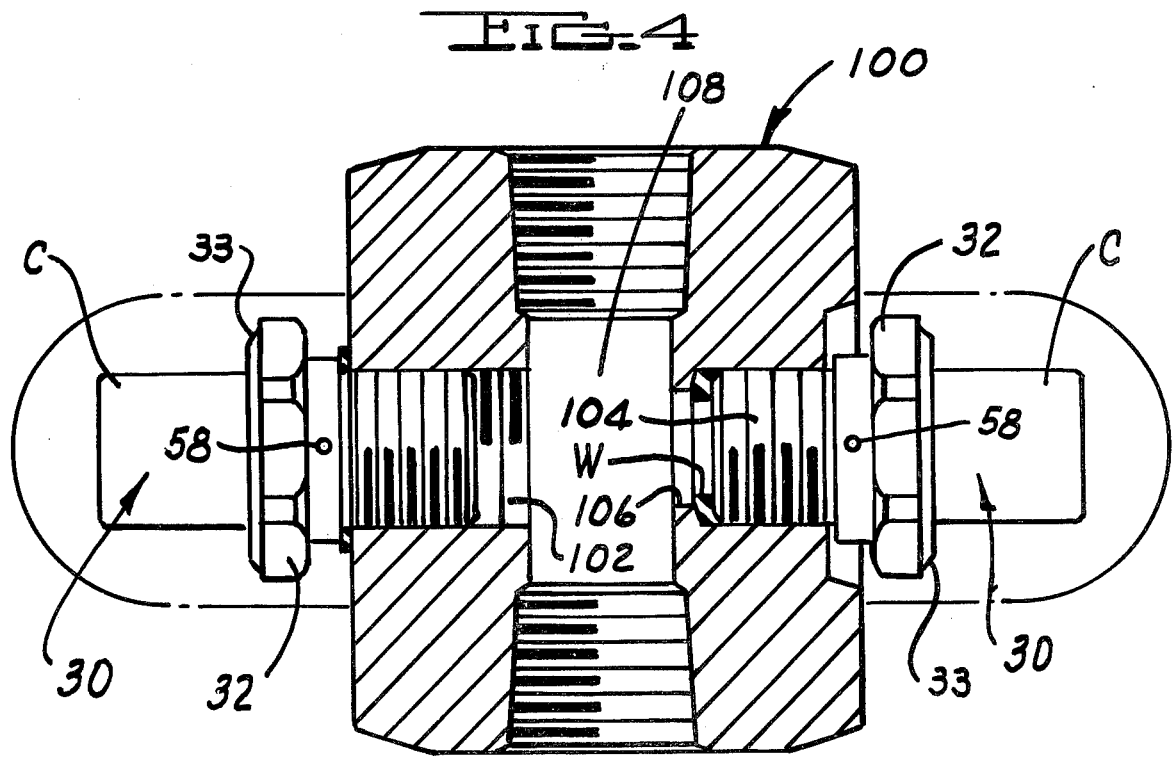

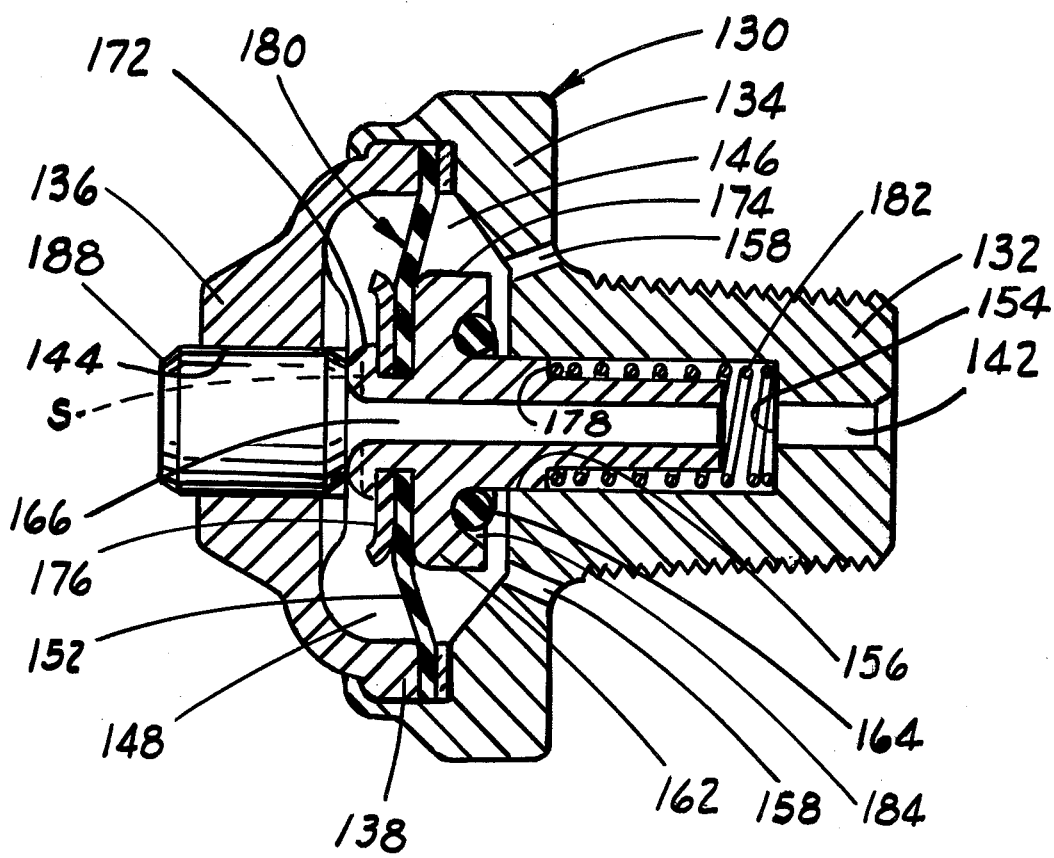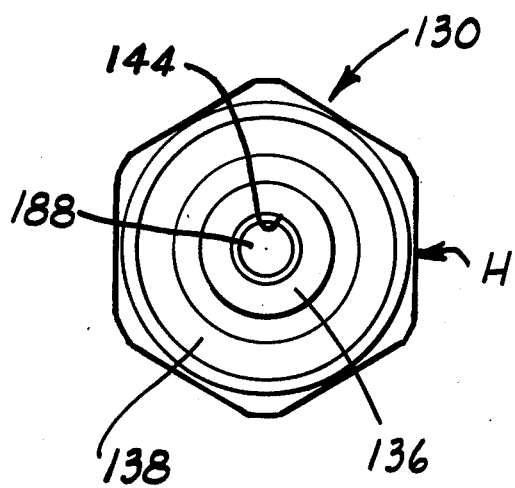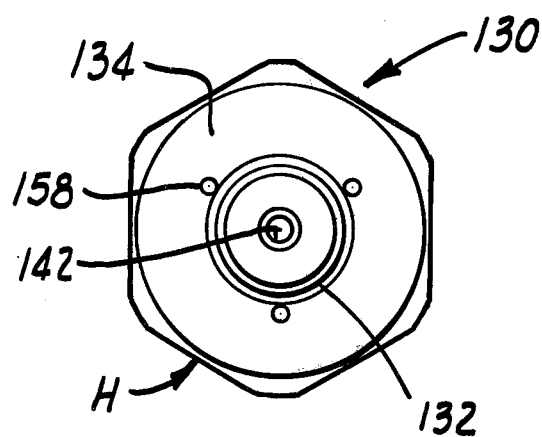

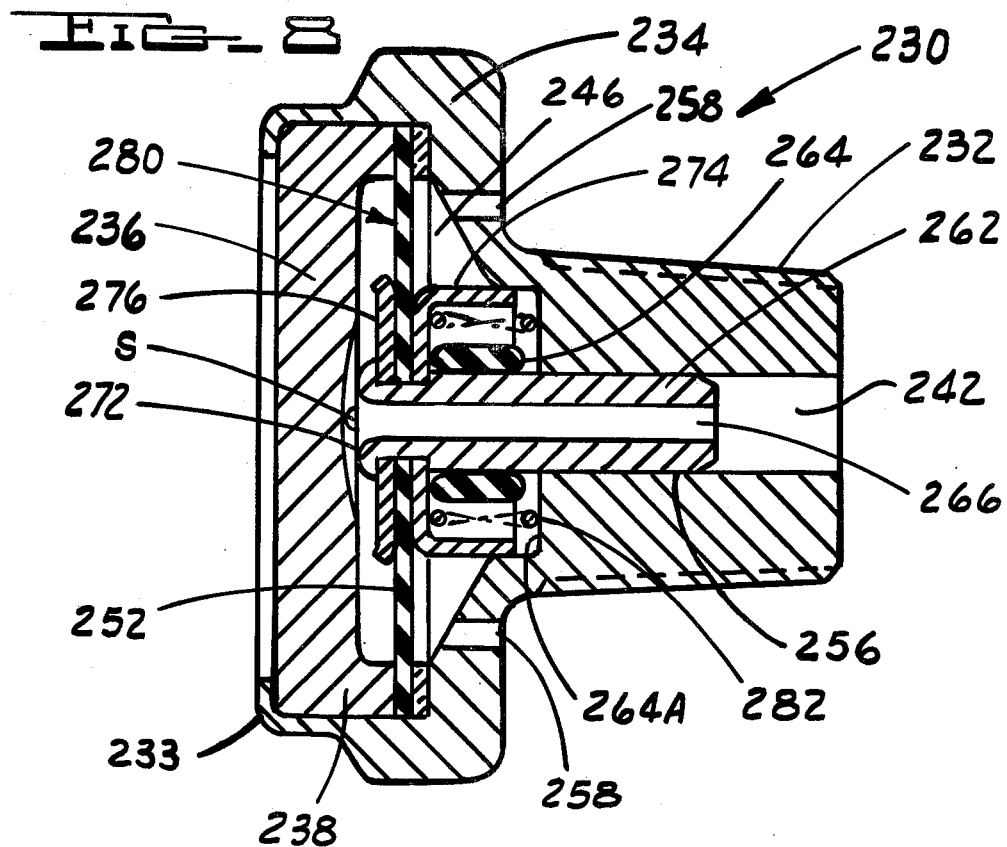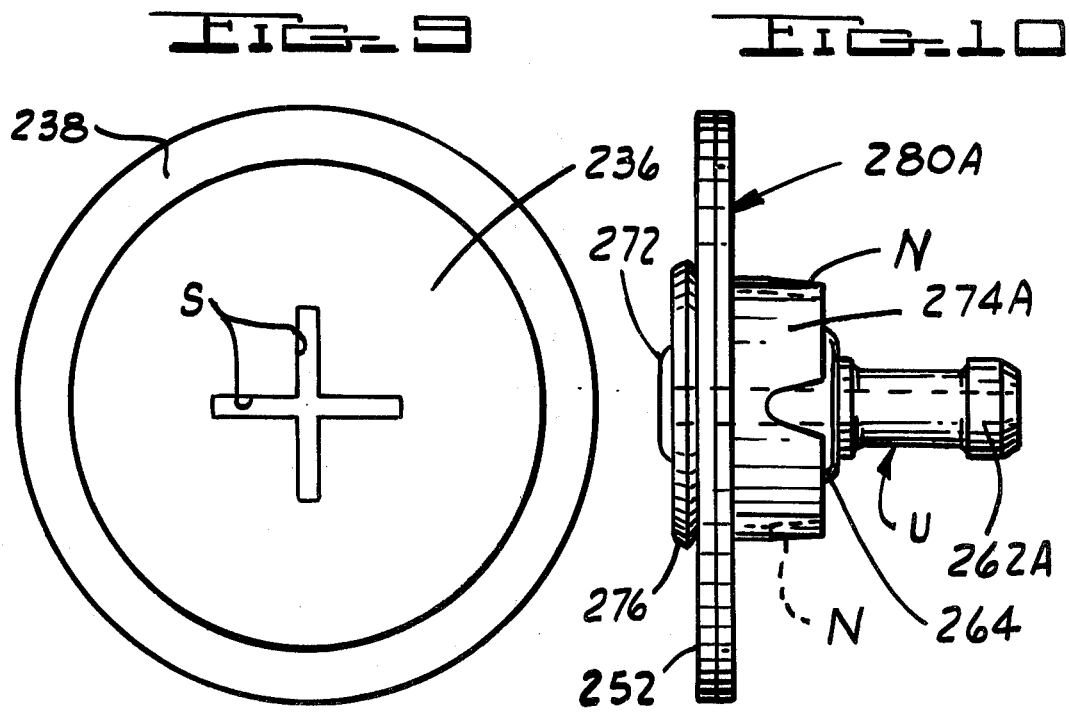

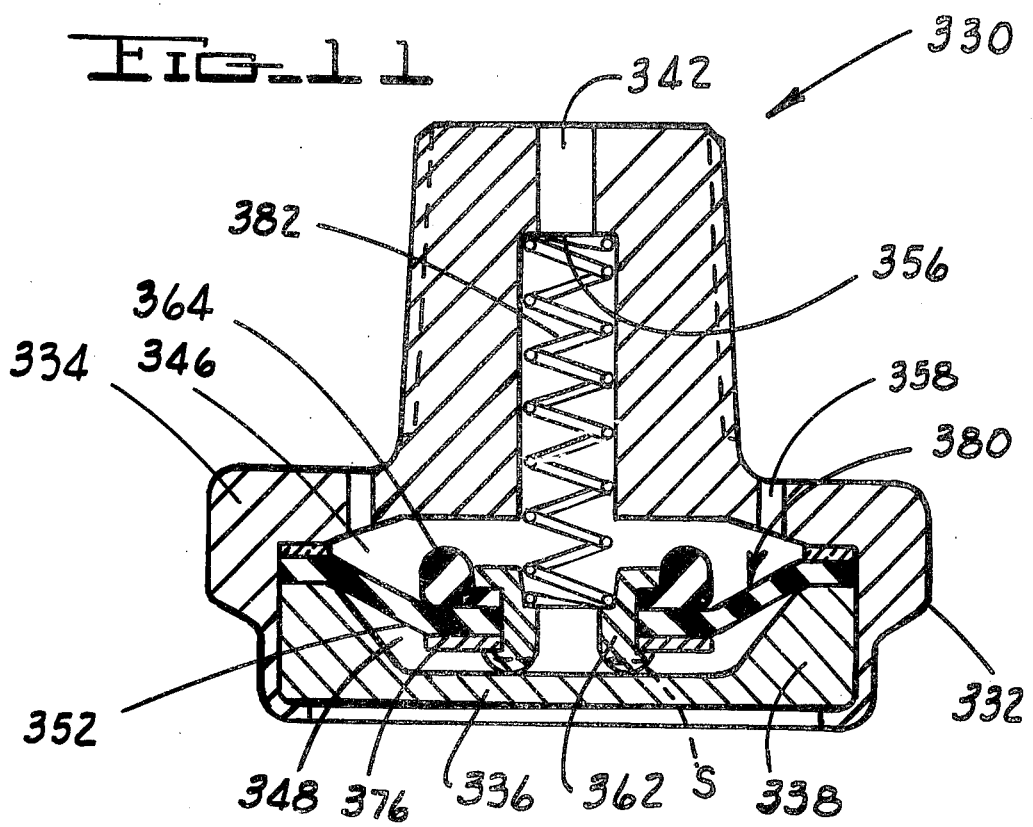
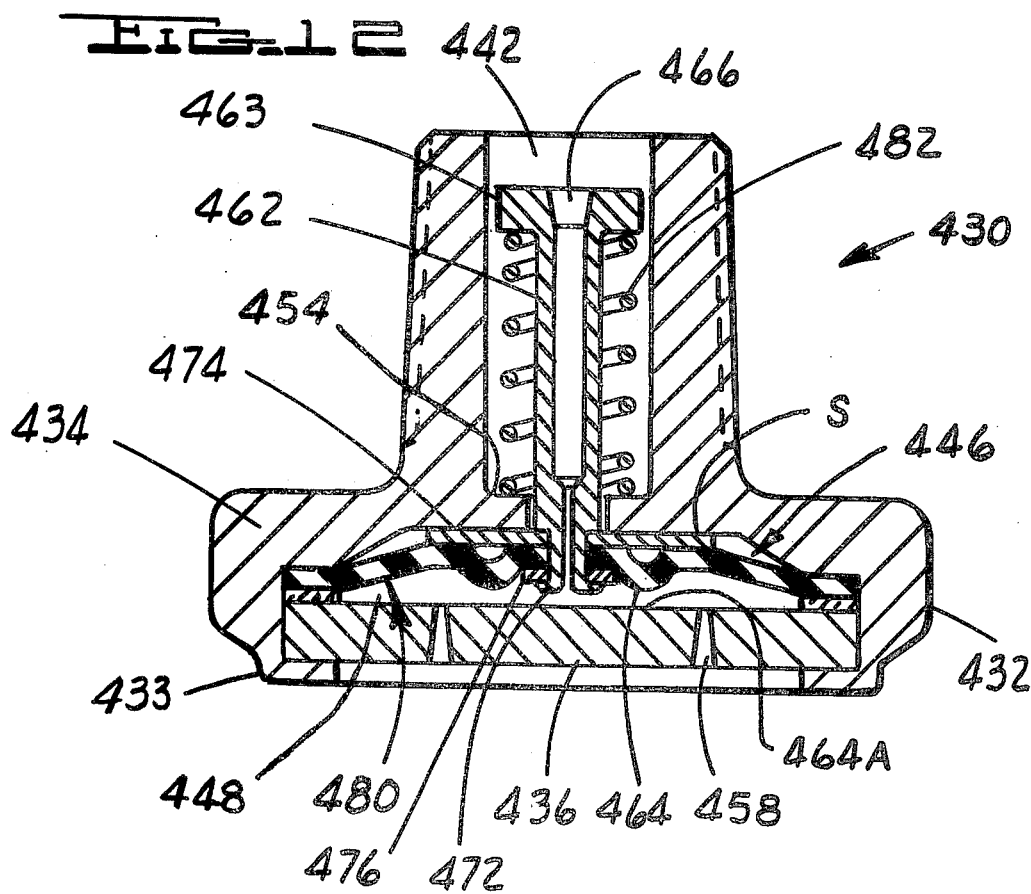

RESIDUAL PRESSURE RELIEF VALVE FOR BRAKES

BACKGROUND OF THE INVENTION

For many, many years, over the road vehicles have encountered severe brake drag problems as a result of residual pressure build-up in the brake system, which problem has been accepted by the trucking industry because of the lack of a satisfactory solution.

In actuality, foot operated brake valves are equipped with either a treadle or a lever connected to linkage for use with a conventional brake pedal or treadle. In operation, when the pedal or treadle, as the case may be, is actuated by the driver's foot, force is applied by means of a resilient plunger acting against a piston. As the piston is moved, the exhaust port is closed and the air inlet is opened. Air pressure from the supply reservoir then flows by the inlet valve and out the delivery ports to the brake chambers which apply the brakes.

When the air pressure in the cavity beneath the piston and the air pressure being delivered to the brake chamber actuators is equal, the mechanical forces on the top of the piston permits the inlet to close, which cuts off any further flow of air from the supply line through the valve and the exhaust remains closed to prevent the escape of air pressure through the exhaust port.

When the pedal or treadle force is removed and the mechanical force removed from the top of the piston, then the air pressure beneath the piston moves the piston to open the exhaust port. The air below the piston and in the delivery lines is then exhausted through the exhaust port.

When quick release valves are used, the quick release valve exhausts the brake chamber air pressure and functions to speed up brake release time by reducing the distance the exhaust air must travel to reach the exhaust port. The quick release valve is operated by air pressure from the brake valve entering the top port on the release valve which forces a diaphragm against an exhaust port seat. This blocks off the exhaust port and permits pressurized air to pass around the edges of the diaphragm and out of each of the side outlets to the brake chambers. As the air pressure is released from above the diaphragm, the air pressure and spring below force the outer edge of the diaphragm to seal on the valve body and at the same time opens the exhaust port seat, opening the exhaust, which opens the brake chambers directly through the exhaust port to atmosphere.

When relay valves are used, the function is much the same as the quick release valves, in that the relay valves are high capacity brake valves which serve as relay stations to speed up application and release time of the brake system.

Therefore, from the foregoing, it would appear that there is no need for the proposed invention, since the brake chambers can be readily exhausted and this is almost true, except for the fact that the exhaust ports in the brake actuating valves, the quick release valves and the relay valves are large and must be immediately closed upon the application of any increased air pressure in the brake system, otherwise the pressurized air escape would be enormous and when the exhaust ports finally closed, the applied brake chamber pressure would be high and the brakes would grab and smooth stops would be impossible, let alone the damage to the equipment.

SUMMARY OF THE INVENTION

It is now apparent that the proposed invention has a place in the modern vehicular brake system, because it functions in a range where existing control valves do not operationally function, nor is a satisfactory valve available currently in the marketplace. Thus, the introduction of a low pressure transducer with a restricted or limited exhaust orifice for the control of residual pressure build-up is a very necessary device, when properly installed intermediate the brake actuating air inlet valve and the brake actuating chambers, which valve in no way interferes with the operation of the existing brake system and when installed in a brake system will pass the Department of Transportation (DOT) total system actuation/shut-down, pressure drop test. The elimination of residual pressure build-up automatically results in substantially better vehicular performance and the reduction of fuel consumption, tire, brake and engine wear etc., as well as a reduction in the vehicular maintenance down-time. The proposed residual pressure transducer provides safety assurance and cycle to cycle operational reliability with minimum maintenance through replacement at pre-determined time or usage intervals. The operational pre-determined characteristics of the residual low pressure actuated transducer also functions to assist in the exhaust of water condensate found in the brake system.

While the system has been described in connection with and using only pneumatically operated valves, the system can be functional by the use of a pneumatically actuated snap action switch which operates a normally open, small orifice solenoid valve, provided the equipment is located intermediate the brake actuating inlet valves and the brake actuating chambers.

Such pressure actuated switches are manufactured by several well known and reputable firms and are available from manufacturer's representatives throughout the country, as are the small orifice solenoid valves. The snap action switch is necessary because of the current draw of the solenoid, which might result in pits and burning of the conductor contacts that would result in pre-mature failure of the switch. To help control this condition, the snap action switch closes at a higher pressure than it opens, thus when it closes on assending pressure, it will not continue to make and brake in the event of a slightly modulating pressure variation, which will of course extend the life of the switch. The snap action switch does of course open on decending pressure below the actuating pressure, for the same reasons above mentioned.

FIG. 14 of the drawings illustrates the above described structure, wherein the snap action pressure switch PS is installed in the service line, as is the small orfice, normally open solenoid valve NOSV. The normally open solenoid valve NOSV may be positioned adjacent the snap action pressure switch PS and on either side thereof, without departing from the spirit and scope of the proposed invention. When the snap action pressure switch PS is activated, a circuit from the battery B is made, which closes the normally open, small orfice, solenoid valve NOSV and returns the that portion of the brake system intermediate the brake actuating valves and the brake chambers BC to the closed state without any interference to the brake system.

From the foregoing, it will be obvious that in a vehicular brake system which has an air storage reservoir tank which is maintained within a pre-determined pressure range by an engine driven compressor and employing a plurality of brake actuating chambers, with each brake chamber being in communication with the pressure source, and having air brake actuating valves disposed intermediate the pressure source and the brake actuating chambers for the control of air passage from the pressure source to the brake actuating chambers, with an automatic residual pressure relief venting structure being provided intermediate the brake actuating valves and the brake actuating chambers for the disipation of any residual pressure build-up caused by any reason whatsoever, is a safer and more utilitarian vehicle.

Such an automatic brake release valve is assembled from a plurality of elements which form an expendible, dual compartment, pressure actuated transducer, which compartments are separated by a motion transmitting diaphragm member positioned between the main body housing member and the cover therefore, with at least one of said compartments being vented to the atmosphere, means communicate at least one of the said compartments with the pressure source when the air brake actuating valve is opened, while closure means are provided intermediate said motion transmitting diaphragm member and the vented compartment, with resilient means in the form of a compression spring being provided to maintain said closure means open to atmosphere in the vented compartment until the pressure source exceeds the force exerted by the resilient means, at which time the closure means shut the vents to prevent further loss of air, thus returning the brake system to the closed condition for normal operation.

Other beneficial results will accrue from the use of the proposed invention when it is properly installed in a vehicular brake system, most of which will appear in the following description and appended claims, reference being had to the accompanying drawings which form a part of this specification, wherein like reference characters designate corresponding parts in the several views.

IN THE DRAWINGS

FIG. 1, illustrates a plan view of a vehicular hose coupling (glad hand) member used for coupling the air lines on large motor trucks, which hose coupling incorporates the use of the proposed residual pressure relief venting valve structure.

FIG. 2, shows an elevational view of the hose coupling illustrated in FIG. 1, in the direction of the arrows 2—2, in the above drawing.

FIG. 2A, is a cross sectional view taken along the vertical axis center-line of FIG. 1, with the proposed residual pressure relief venting valve structure removed from the threaded opening located therein.

FIG. 2B, is a modified cross sectional view similar to FIG. 2A, wherein the main body housing of the proposed residual pressure relief venting valve structure is integral with the body of the hose coupling.

FIG. 3, represents a cross sectional view of the closed position of a proposed residual pressure relief venting valve structure.

FIG. 4, illustrates two of the proposed residual pressure relief venting valve structures positioned in a cross drilled and threaded body, showing two forms of thread seals.

FIG. 5, represents another cross sectional view of a proposed residual pressure relief venting valve.

FIG. 6, is a left end elevational view of the structure shown in FIG. 5, of the drawings.

FIG. 7, is a right end elevational view of the structure shown in FIG. 5, of the drawings.

FIG. 8, shows a cross sectional view of another proposed residual pressure relief venting valve structure.

FIG. 9, is an inside elevational view of the cover member illustrated in FIG. 8, of the drawings.

FIG. 10, is an elevational view of a modified motion transmitting diaphragm and closure assembly, similar to the structure shown in FIG. 8.

FIG. 11, shows a cross sectional view of still another form of proposed residual pressure relief venting valve structure.

FIG. 12, is another form of the proposed residual pressure relief valve structure in cross section.

NOW THE INVENTION

Figure 12A:
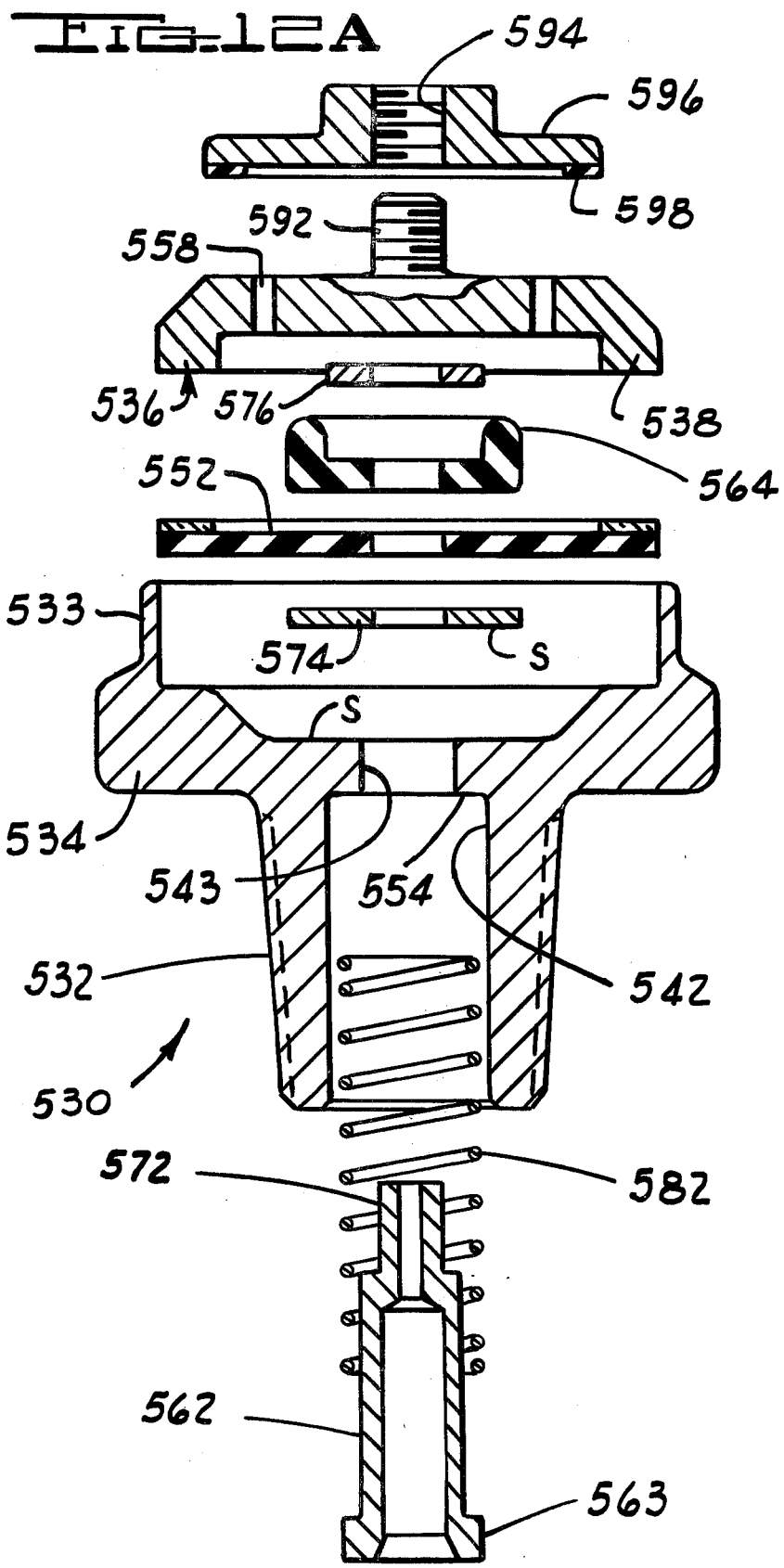
FIG. 12A, is an exploded cross sectional view of a residual pressure relief venting valve structure which incorporates a protective deflector and sealing means.

While the proposed invention may have numerous embodiments, it must be understood that the invention is not limited in its application to the details of construction and arrangement of parts illustrated, since the invention can be carried out in various ways and that the phraseology and terminology employed herein is for the purpose of description and not of limitation.

The utility of the proposed invention is enormous, since its usage results in economies heretofore unimaginable in the trucking industry. The proposed pressure relief venting valve structure is used on pneumatically operated vehicular brakes and the like and permits atmospheric air to be introduced into the brake system intermediate the air brake actuating valves and the brake chambers actuated thereby. When the brake actuating air valve is opened to the pressurized air source, the ascending air pressure upon reaching a pre-determined amount closes the pressure relief venting valve so as to provide the normal closed brake system operation. When the brakes are released and the air brake actuating valve shut-off from the pressure source, the pressurized air in the system is exhausted, which opens the relief valve so as to again vent that portion of the brake system to atmosphere.

With reference to the drawings, FIGS. 1, 2, 2A and 2B are representative of one-half of a two part hose coupling of generally symmetrical configuration and adapted to be rotated for locking engagement with each other. The proposed residual pressure relief venting valve 10 is shown in FIG. 1 of the drawings assembled onto the hose coupling body 12, as is the case in FIG. 2. It will be observed that the locking flange which is used to hold both halves of the coupling together when they are rotated into engagement have not been illustrated, since the invention in the present instance relates only to the coupling body 12, which is illustrated. In FIG. 2A of the drawings, the coupling body 12 has positioned therein a threaded opening 14, which provides the means for securing the proposed residual pressure relief valve. The coupling seal 16 is disposed beneath the threaded opening 14, in the air passage 18, which intersects the openings in the threaded opening 14 and the seal 16. While a threaded opening has been illustrated, a straight passage could be employed which would permit a pressure relief valve to be pressed into the coupling body, also the opening could form one-half of a quick disconnect coupling, with the other half being located on the pressure relief valve, or such other means of expediency as may be desirable without departing from the spirit and scope of the invention. The hose coupling body 12A shown in FIG. 2B illustrates the main residual pressure valve housing 20 as being integral therewith and disposed opposite the coupling seal 16A and in communication with the air passage 18A. The specific configuration of the integral body housing 20 can of course be substantially identical with either of the body housings described in connection with any of the embodiments hereinafter described, such as that of FIGS. 3, 5, 8, 11 and 12 respectively. For ease of description, the structure will be described in connection with each of the respective enlarged cross sectional views illustrated hereinafter, with the respective description being applied to the structure of FIG. 2B.

The proposed structure as illustrated in connection with FIG. 3 of the drawings shows a complete residual pressure relief venting valve 30, the main body housing 32 has a flange 34 which is integral therewith, as does the cover 36 which has flange 38 integral therewith. The main body housing 32 has an axial passage 42 therein, while the cover 36 also has an axial passage 44 therein, with the intersecting flange portions 34 and 38 being separated by a motion transmitting diaphragm 52, so as to define two compartments 46 and 48. Compartment 46 is located in the main body housing 32, while compartment 48 is disposed in the cover member 36. Before assembly of the motion transmitting diaphragm 52 in the main body housing 32, a hollow insert 54 is pressed (or threaded) into the body housing 32 from the flanged end portion 34, the enlarged end portion thereof forms a stop for limiting the displacement of the motion transmitting diaphragm, while the reduced diameter on the opposite end of the hollow insert 54 forms a closure seat between the cavity 56 which communicates with the vent openings 58 in the main body housing 32. A flanged needle shut-off means 62 has a resilient seal means 64 positioned therearound, while the hollow body portion 66 communicates with a passage that intersects compartment 46. The outermost end 72 of the flanged needle 62 is undercut and extends through a pair of flanged washers 74 and 76 which provide support for the diaphragm 52, and a seat for the compression spring 82 positioned in the cover 36. When the flanged shut-off means 62 is assembled with the resilient seal means 64 and inserted into the main body housing 32, through the hollow insert 54 and the undercut outer end 72 inserted through the openings in the flanged washers 74 and 76 respectively, the end portion 72 is riveted over so as join the individual parts to the diaphragm 52 into a unitary assembly. Thereafter, the flanged portion 38 of the cover 36 is positioned in engagement with the outer diameter of the motion transmitting diaphragm 52 and securely rolled or swaged into sealed engagement (leak-proof) with the main body housing flange 34, after which the compression spring 82 is inserted into the axial passage 44 in the cover 36 and positioned therein by means of an adjustable spring retainer 84 which is in threaded engagement with a corresponding threaded portion in the cover 36. An opening 86 extends through the spring retainer 84, so as to provide an atmospheric vent for compartment 48 in the cover 36. Additionally, the outer surface of the cover member 36 has a straight knurl 88 thereon, so that if a cover (not shown on FIG. 3) is used to protect the spring retainer vent 86 from foreign objects, as illustrated in FIGS. 1, 2 and 4 by the letter "C," the atmospheric vent will then be located about and between the spaces formed by the knurl and the cover "C." It will be noted that the residual pressure valve 30 is shown in its closed position, which position the valve would assume when chamber 46 is pressurized, and upon release of the pressure, the relief valve 30 would then return to its normally open position. Should it be found desirable to increase the valve closing pressure, the spring retainer 84 is merely rotated to pre-load the compression spring 82 to a greater degree. Should a lesser load be desirable, the spring retainer is merely moved in the opposite direction, thus reducing the pre-load.

FIG. 4 of the drawings illustrates two residual pressure relief venting valves 30, as shown in FIG. 3, mounted in a cross drilled body 100 in a generally horizontal position. The vertical opening therein intersects the cross drilled and threaded portions 102 and 104 respectively, although the cross drilled and threaded portion 102 extends completely through the body 100, the drilled and threaded portion 104 has a flanged section 106 on its intermost end at the point of intersection with the vertical opening 108. Since difficulties are sometimes encountered in obtaining leak-proof threaded connections, a soft washer is disposed intermediate the flange portion on the main body housing of the relief valve 30 and the outer surface of the cross drilled body 100. This provides a simple and positive thread seal, without resorting to sealing compound or the use of a "Teflon" tape wrap, each of which are slow and cumbersome. When the sealing structure shown on the right side of the cross drilled body 100 is used, the soft washer is disposed between the bottom of the main body housing 32 of the relief valve 30 and the flanged portion 106 in the cross drilled and threaded portion 104. While the soft washer used was made from lead, other materials could be successfully employed with equally satisfactory results.

The residual pressure relief valve shown in FIG. 5 illustrates a complete valve assembly 130 wherein the main body housing 132 has a flanged portion 134 integral therewith, as does the cover 136 which incorporates the integral flanged portion 138. The main body housing 132 has an axial passage 142 therein, while the cover has plug 188 pressed into passage 144 located therewithin. The intersecting flange portions 136 and 138 are separated by a resilient diaphragm 152, so as to define two compartments 146 and 148 respectively. Compartment 146 is located in the main body housing 132, with compartment 148 being disposed in the cover member 136. The main body housing 132 axial passage 142 has a step 154 intermediate its ends which forms a seat for one end of the compression spring 182. The other end of the spring 182 is seated against a relieved portion 178 in the flanged hollow needle 162. Vents 158 are positioned in the main housing flange 134, three in number and symmetrically spaced and positioned as shown in FIG. 5. The motion transmitting resilient diaphragm 152 is assembled against the flanged portion 174 of the hollow needle 162, while the flanged washer 176 is positioned over the end 172 of the hollow needle 162, which is thereafter riveted over to form a unitary assembly. A resilient closure seal 164 is positioned against another relieved portion 184 in the flange 174 of the needle 162. The complete resilient diaphragm assembly 180 is then inserted into the axial passage 142 from the flanged end 136 of the main body housing 132, with the compression spring 182 disposed between the step 154 in the main body housing 132 and the relieved portion 178 in the hollow needle 162. Thereafter, the cover member 136 is assembled into the main body housing 132, with the respective flanged portions 134 and 138 engaging the outer diameter of the resilient diaphragm assembly 180, at which time the main body housing thin flange is securely rolled or swaged into sealed engagement (leak-proof) over the cover flange 138. The adjustable plug 188 in the cover 136 is then properly positioned for the proper displacement of the resilient motion transmitting member. Serrations are found on the inner end of plug 188, as well as on the inner surface of the cover 136, so as to permit pressurization of compartment 148. The vented passages 158 are communicated to the air source through axial passage 142 in the main body housing 132 and then between the space 156 between the outer surface of the needle 162 and the enlarged portion of the axial passage 142.

FIGS. 6 and 7 of the Drawings delineate left and right end elevational views of the residual pressure relief valve structure shown in FIG. 5 of the drawings, illustrating the hexogonal configuration of the proposed valve 130 which provides a means for application of a wrench when assembling the valve in position for usage. While a hexagonal configuration is shown, other configurations could be employed with satisfactory results, without departing from the spirit and scope of the invention.

The residual pressure relief valve shown in FIG. 8 is similar to the structure shown in FIG. 5, except for the location of the compression spring 282. The complete valve assembly 230 has a main body housing 232 which has a flanged portion 234 integral therewith, while the cover 236 incorporates an integral flange portion 238. The main body housing 232 has a generally straight axial passage 242 therein, while the cover 236 differs from the previous structure, in that there is no axial passage therethrough. The intersecting flange portions 236 and 238 respectively are separated by a resilient motion transmitting diaphragm 252, thereby defining two compartments 246 and 248. Compartment 246 is found in the main body housing 232, with the remaining compartment being found in the cover 236 and identified as number 248. The axial passage 242 in the main body housing 232 provides a pilot or guide for the body of the generally hollow needle 262, while the end of the hollow needle is undercut for insertion through the central openings in the cup flanged spring seat member 274, the resilient motion transmitting diaphragm 252 and the flanged washer 276, with the end 272 of the hollow needle 262 being riveted over so as to form a diaphragm assembly 280, as shown in FIG. 10. Vents 258 are located in the flanged portion of the main body housing 232 either in symmetry or in random locations. Before final assembly of the valve, a resilient closure seal is positioned over the outer surface of the hollow needle 262 and into engagement with the generally flat undersurface of the cup flanged spring seat member 274. The complete diaphragm assembly 280 is then inserted into the axial passage 242 from the flanged end 236 of the main body housing 232, with the compression spring 282 being disposed between the closure seat 264-A in the main body 232 and the cup flanged spring seat member 274 secured to the diaphragm assembly 280. Thereafter, the cover member 236 is assembled into the main body housing 232, while the respective flanged portions 234 and 238 engage the outer edge of the resilient diaphragm assembly 280, at which time the main body housing thin flange is securely rolled or swaged into sealed engagement (leak-proof) over the cover flange 238. Serrations of suitable cross section are located on the inner surface of the cover 236, so as to permit pressurization of compartment 248 through the passage 266 in the hollow needle 262. The vented passages are communicated with the pressure source by means of the space 256 between the outer surface of the hollow needle 262 and the axial passage 242 in the main body housing 232.

FIG. 9 of the drawings shows the inside of the cover 236, the flange portion 238 thereof and the serrations S which are centrally positioned therein. While the serrations are illustrated as being in the form of a cross, they be of most any size or configuration, since their function is to permit pressurization of the diaphragm displacement compartment 248, while the structure shown in FIG. 10 represents a modified resilient motion transmitting diaphragm assembly 280A, wherein the flanged spring seat 274A is notched about the circumference for ease of air passage therethrough, while the needle body 262A is undercut for the same reason.

The residual pressure relief valve structure 330 shown in FIG. 11 is similar to the structures shown in FIGS. 5 and 8, with the exception of the elimination of the hollow needle. The complete valve assembly 330 incorporates the use of a main body housing 332 and integral flanged portion 334, while the cover 336 has an integral flange portion 338. The intersecting flange portions 334 and 338 are separated by a resilient motion transmitting diaphragm 352, so as to define a pair of compartments 346 and 348. Compartment 346 is found in the main body housing 332, while the second compartment is disposed in the cover member 336 and identified as number 348. The axial passage 342 in the main body housing 332 provides a pilot for the compression spring 382 and is seated in the step 354 in passage 342. The opposite end of the compression spring 382 is seated in a bushing 362, which is generally hollow and is used to position the resilient closure member 364, the resilient diaphragm and the support washer 376 as a unitary assembly when the end 372 is riveted over. Venting means are located in the flanged portion of the main body housing 332 in the form of a plurality of openings 358 which are disposed intermediate the closure means 364 and the pressure source passage 342. When the pressure relief valve is assembled, the resilient compression spring 382 is deposited in the axial passage 342 and against the step 356, after which the resilient diaphragm assembly 380 is positioned within the flanged portion 334 of the main body housing 332, with the compression spring 382 seated in the bushing 362. Thereafter, the cover member 336 is assembled into the main body housing 332, while the flanged portions thereof 334 and 338 respectively engage and clamp the resilient motion transmitting diaphragm 380 into sealed (leak-proof) engagement when the thin flange on the main body housing is rolled or swaged over the cover flange 338. Serrations in the riveted end 362 communicate the pressure source with the compartment 348 so as to permit the pressurization thereof when required.

Pressurization of compartment 348 in excess of the compression pre-load causes displacement of the diaphragm assembly 380 to seat the closure means 364 against its seat, and thereby shut the vents 358 from the pressure source.

The residual pressure relief venting valves shown in FIGS. 12 and 12A are similar to that shown in FIG. 3, since the valve is actuated in the direction of pressure source, while the structures of FIGS. 5, 8 and 11 are actuated in the opposite direction of the pressure source. The proposed residual pressure relief valve structure shown in FIG. 12 is identified as assembly 430 and incorporates a main body housing 432 with a flanged portion 434, while the cover 436 is a substantially flat disc which may have a flanged portion 438 as shown in FIG. 12A. The axial passage 442 in the main body housing 432 provides a pilot for the flanged end of the needle 462, while the stem 454 in the passage 442 is centrally located in the flanged portion 434 in the main body housing 432. The flanged portion 463 of the needle 462 provides the seat for the compression spring 482 on one end, while the step 454 forms the spring seat on the opposite end. The body of the generally hollow needle 462 is undercut on its outermost end and has positioned thereover the support washer 474, a molded resilient motion transmitting diaphragm 452 which incorporates the closure means 464 integral therewith and has the second support washer 476 positioned in the central recess in the resilient diaphragm 452, after which the end 472 of the needle 462 is riveted over to form a unitary valve body assembly. The positioning of the resilient diaphragm in the main body housing 432 defines compartment 446, while the assembly of the cover 436 into the flanged portion 434 of the main body housing 432 defines compartment 448. When the assembly of the respective elements is complete, the thin flange on the main body housing 432 is rolled or swaged so as to clamp the the outer edges of the resilient diaphragm between the flanged portion 434 and the cover 436 in sealed (leak-proof) engagement. Vents 458 are found in the cover 436, which cover forms the seat for the closure means 464. The closure means 464 is disposed intermediate the vents 458 and the pressure source. Serrations may be used on the surface intermediate the central portion of the flanged main body portion 434 or on the engaging surface of the washer 474 if necessary, so as to more readily communicate the pressure source with the valve actuating chamber 446 when the pressurized air passes around the outer surface of the needle 462 and through the axial passage adjacent the step 454 therein.

The residual pressure relief venting valve structure 530 shown in FIG. 12A of the drawings is an exploded view of a valve structure substantially the same as that shown in FIG. 12, with the exception being that the closure means 464 was integral with the diaphragm 452, while in the exploded view the resilient closure means is a separate molded part, although positioned in the same relative location. It will be observed that the hollow flanged needle 562 is inserted into the compression spring 582 and this sub-assembly is inserted into the axial passage 542 in the main body housing 532, one end of the compression spring being in engagement with the flange 563, with the opposite end thereof being in engagement with the step 554. The undercut end 572 of the needle 562 is then moved through the reduced diameter 543 of the axial passage 542 and through the respective openings in the support washer 574, the resilient motion transmitting diaphragm, 552, the resilient closure means 564 and then through the retaining support washer 576, after which the end 572 of the needle 562 is riveted over to form a unitary valve body assembly. The vented cover 536 is then positioned in the outer end of the main body housing 532 and the thin flange 533 rolled over or swaged, clamping the outer edged of the resilient diaphragm 552 therebetween in sealed (leakproof) engagement. The cover member 536 has a threaded extension 592 thereon which is cooperable with the protective deflector 596 and the threaded opening 594. Seal means 598 are secured by suitable means to the underside of the protective deflector 596, so that if a rupture should develop in the diaphragm 552, rotation of the protective deflector 596 into engagement with the surface of the cover 536 will seal same against loss of air.

Figure 13:
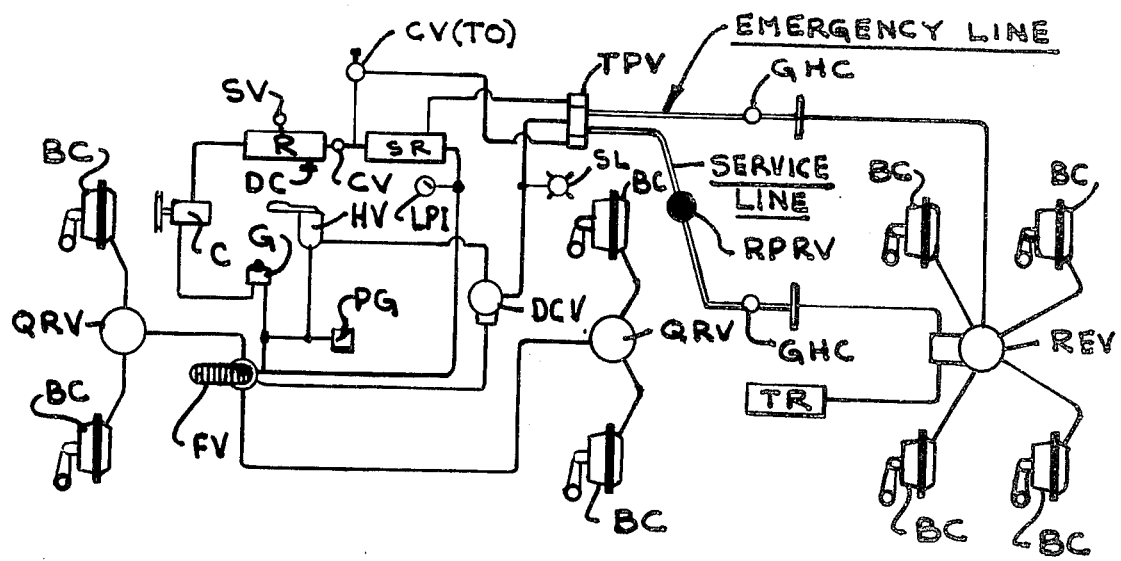
FIG. 13 is a schematic drawing of a typical air brake system showing a tractor and trailer which incorporates the proposed invention.
Figure 14:
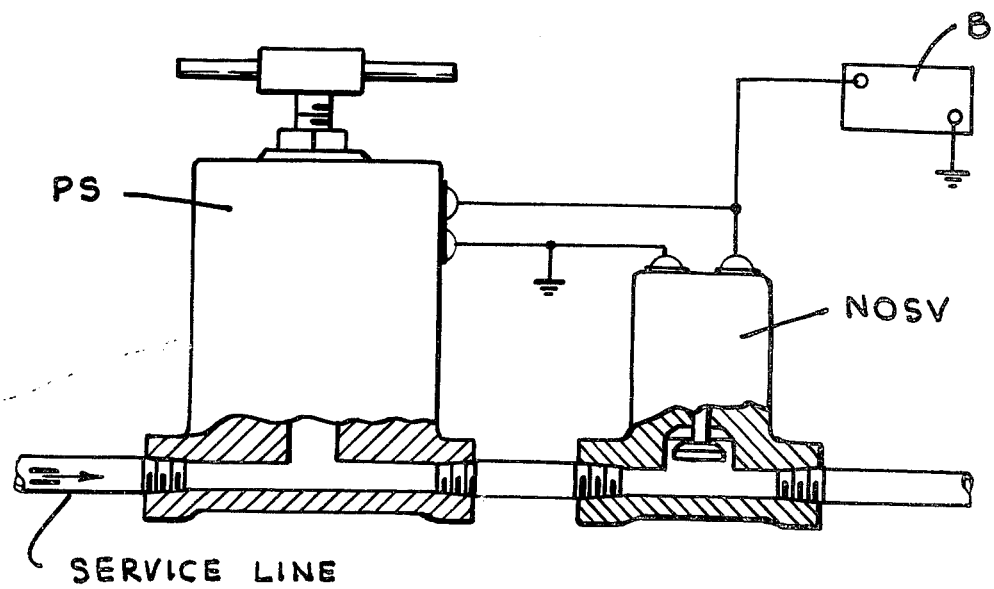
FIG. 14 is a schematic view of a modified electrically actuated snap action pressure switch which functions a normally open solenoid valve.

For a better understanding of the typical air brake system, FIG. 13 delineates same, as well as the location of the residual pressure relief valve RPRV in the service line. The above described residual pressure relief valve RPRV is located intermediate the brake actuating valves (hand valve HV and foot valve FV) and the respective brake chambers BC. Also illustrated is the engine driven compressor C, which supplies the reservoir R and the service reservoir SR. Reservoir R is fitted with a safety valve SV and a drain cock DC, while the check valve CV is interposed between reservoir R and the service reservoir SR. The service reservoir SR is in communication with the foot valve FV and the hand valve HV, each of which are in communication with with the brake chambers BC, after passing thru a quick relief valve QRV on the front and rear of the tractor. The brake actuating valves are also in communication with a double check valve DCV which communicates with the tractor protection valve TPV which is in communication with the service line and emergency line between the tractor and trailer. The trailer service line and emergency line are joined to the trailer by means of glad hand couplings GHC. Intermediate the tractor protection valve TPV and the glad hand coupling GHC in the service line is positioned the residual pressure relief valve RPRV, the subject of the present invention. Both the service line and the emergency line are in communication with the relay emergency valve REV on the trailer, which is also in communication with the trailer reservoir TR. Also shown in the drawing is a control valve in the tractor only CV(TO) which communicates with a portion of the tractor protection valve TPV, while a low pressure indicator LPI is positioned in the line communicating the supply reservoir SR with the foot valve FV. A pressure gage PG is located intermediate the hand valve HV and foot valve FV, while a governor G is disposed in a line from the supply reservoir SR and the compressor C. A stop light SL is located intermediate the double check valve DCV and the tractor protection valve TPV. The total system functioning to stop the tractor and trailer under each and every operation condition.

While the descriptions of the various embodiments are believed to be complete and accurate, it must be understood that variations of the proposed invention will occur and that future improvements will be made, however, at the present time there is no available valve structure in the marketplace which functions in the manner of the proposed invention and accomplishes the results obtained by the use of the proposed invention. There is a dire need in the trucking industry for this invention, since its use results in substantial efficiency increases through reduced fuel consumption, reduced break wear, reduced tire wear and distruction, reduced engine wear, reduced maintenance and reduced downtime. Driver time loss will likewise be reduced, since the brakes will not drag, heat up and seize, at which time the driver must either sit it out and wait for the brakes to cool so the vehicle can be moved, or he must call a tow truck. The alternative being the installation of the proposed invention in the brake system intermediate the brake actuating valves and the brake actuating chambers.

Having thus described our invention, We claim:

1. In a vehicular brake system having an air storage reservoir tank which is maintained within a pre-determined pressure range by an engine driven compressor, and employing a a plurality of brake actuating chambers, each chamber being in communication with the pressure source, with air brake actuating valves being disposed intermediate the pressure source and the brake actuating chambers, for the control of air passage from the pressure source to the brake actuating chambers, the improvement of, an automatic, low pressure, brake release structure in the form of an open residual pressure relief venting valve which functions to admit atmospheric air into the closed portion of the brake system intermediate the air brake actuating valves and the brake chambers, so as to disipate any potential residual pressure build up for any reason whatsoever, and to assist in the exhaust of any water condensate, when the brakes are applied and upon reaching a pre-determined pressure the vent valve closes restoring the closed brake system to its normal operation.

2. A structure as in claim 1, wherein the residual pressure relief venting valve is in the form of a unitary expendible assembly which is readily replaced throughout the life of the body housing in which the valve is mounted, such service maintenance occurs at scheduled pre-determined time/usage intervals, so as to provide maximum safety and dependability of operation.

3. A structure as in claim 2, wherein a single residual pressure relief venting structure is mounted on at least one section of a conventional two-part hose coupling assembly in the air brake service line.

4. A structure as in claim 2, wherein a residual pressure relief venting structure is mounted on each section of a conventional two-part hose coupling assembly in the air brake service line.

5. A structure as in claim 2, wherein a single residual pressure relief valve is mounted in one outlet of a "T" fitting positioned in the air brake service line.

6. A structure as in claim 2, wherein a plurality of residual pressure relief venting structures are mounted on a multi-cross drilled and threaded body member positioned in the air brake service line.

7. A structure as in claim 2, wherein the residual pressure relief venting structure is a solenoid valve located in the air brake service line and is actuated by an electric pressure switch.

8. A structure as in claim 2, wherein the expendible pressure relief venting structure is assembled from a plurality of elements which form a dual compartment pressure actuated transducer in which the two compartments are separated by a motion transmitting member intermediate each of the two body housing members; each of the two body housing members have an axial passage therein which extends therethrough, while the main body housing has a second passage therein which communicates with the external body housing surface;

a generally hollow insert is disposed in the axial passage and communicates the second passage in the main body housing so as to form a closure seat on the outermost end thereof, adjacent the first compartment on the opposite end thereof;

a shut-off means cooperable with the closure seat is disposed within the generally hollow insert and has a communicating and intersecting passage with the first compartment;

said shut-off means is rigidly attached to said motion transmitting member so as to form a unitary assembly;

the body housing cover is positioned against the motion transmitting member and in sealed engagement therewith;

a resilient member is positioned within the axial passage in body housing cover and is held in contact with the motion transmitting member by means of a vented adjustable member, thus functioning to limit the displacement of the motion transmitting member and closure shut-off means within predetermined applied load limits when pneumatic actuation of the first main body housing compartment occurs.

9. A structure as in claim 2, wherein the expendible residual pressure relief venting device is assembled from a plurality of elements that form a double compartment, which compartments are separated by a motion transmitting resilient diaphragm positioned between the main body housing member and the cover therefore;

at least one of said compartments is vented;

passage means communicating at least one of said compartments with the pressure source;

closure means intermediate said vented compartment and said pressure source;

and pre-load resilient means for maintaining said vented compartment to atmosphere, until the said pressure source exceeds the pre-load force exerted by the said resilient means.

10. A device as in claim 9, wherein the venting compartment is intermediate the motion transmitting resilient diaphragm and the cover therefore.

11. A device as in claim 9, wherein the venting compartment is intermediate the motion transmitting resilient diaphragm and the main body housing member.

12. A device as in claim 9, wherein the resilient means is in the cover of said residual pressure relief venting structure and may be adjustable.

13. A structure as in claim 9, wherein the resilient means is in the main body member and disposed along the axis of displacement of the motion transmitting member.

14. A structure as in claim 9, wherein the resilient means is disposed so as to lie within the closure means; with the closure means forming a part of the motion transmitting member.

15. A structure as in claim 9, wherein the resilient means is disposed outside the closure means, while the guide for said resilient means is piloted on at least one surface of said main body member.

16. A structure as in claim 9, wherein the resilient means is in the form of a compression spring.

17. A structure as in claim 9, wherein adjustable means are provided for limiting the displacement of the motion transmitting member.

18. A structure as in claim 9, wherein adjustable means are provided for control of the load exerted by the resilient means against the motion transmitting member.

19. A structure as in claim 9, wherein support means are provided on both sides of said motion transmitting member, so as to minimize the potential of compartment communication when the vented compartment is closed to atmosphere.

20. A structure as in claim 9, wherein the means communicating the pressurized compartment is in the form of at least one undercut portion intermediate the surfaces maintained in contact by said resilient means.

21. A structure as in claim 9, wherein the main body is molded integral with the body of at least one hose coupling member.

22. A device as in claim 9, wherein the cover member has a threaded extension thereon which is cooperable with a dual function protective deflector that keeps foreign material out of the vent openings and may be turned down so as to engage the surface of the cover and seal same against an air leak in the event of a rupture of the motion transmitting member.

23. A device as in claim 9, wherein the vented compartment has a tapered outlet, small on the inner surface of the compartment and larger on the outer surface, so that in the event of a water condensate freeze up in the vent opening, the tapered surface of the vent will self expel the ice formed therein.

* * * * *